United States Patent
Carlson et al.

(10) Patent No.: US 8,355,054 B2
(45) Date of Patent: Jan. 15, 2013

(54) ARRANGEMENT FOR AND METHOD OF ACQUIRING A MONOCHROME IMAGE WITH A COLOR IMAGE CAPTURE PROCESSOR

(75) Inventors: Bradley Carlson, Huntington, NY (US); Frank DeMarco, Mount Sinai, NY (US); Alan Epshteyn, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 428 days.

(21) Appl. No.: 12/603,624

(22) Filed: Oct. 22, 2009

(65) Prior Publication Data

US 2011/0096181 A1   Apr. 28, 2011

(51) Int. Cl.
*H04N 5/228* (2006.01)
*H04N 9/797* (2006.01)
*G06K 9/00* (2006.01)

(52) U.S. Cl. .................. 348/222.1; 382/163; 386/307
(58) Field of Classification Search .................. None
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,557,426 A * | 9/1996 | Sakata | 358/448 |
| 5,703,349 A | 12/1997 | Meyerson et al. | |
| 2008/0278592 A1 * | 11/2008 | Kuno et al. | 348/222.1 |
| 2009/0040234 A1 * | 2/2009 | Kobayashi et al. | 345/604 |
| 2009/0154800 A1 * | 6/2009 | Kojima et al. | 382/165 |
| 2010/0073739 A1 * | 3/2010 | Sekiguchi et al. | 358/474 |

* cited by examiner

*Primary Examiner* — Albert Cutler
(74) *Attorney, Agent, or Firm* — Non-Qiang Fan

(57) ABSTRACT

An arrangement for, and a method of, acquiring a monochrome image of a target, employ a solid-state imager for capturing return light from the target over a field of view, and for generating an output image data stream having image components arranged in a serial format at a clock frequency, a preprogrammed microprocessor operatively connected to the imager for serially receiving, sampling and processing the image components at a sampling frequency to generate the monochrome image of the target, and a clock frequency adjustment circuit operatively connected to the imager and the microprocessor for adjusting the clock frequency to enable the microprocessor to receive, sample and process the image components and generate the monochrome image.

6 Claims, 3 Drawing Sheets

ARRANGEMENT FOR AND METHOD OF ACQUIRING A MONOCHROME IMAGE WITH A COLOR IMAGE CAPTURE PROCESSOR

DESCRIPTION OF THE RELATED ART

A digital camera module can be found in many mobile electrical devices, for example, an electro-optical reader, a cellular telephone, a music player, a portable digital assistant, a laptop computer, and so on. In the case of the electro-optical reader, the camera captures images from diverse targets, such as one-dimensional bar code symbols, particularly of the Universal Product Code (UPC) type, each having a row of bars and spaces spaced apart along one direction, as well as two-dimensional symbols, such as Code 49, which introduced the concept of vertically stacking a plurality of rows of bar and space patterns in a single symbol, as described in U.S. Pat. No. 4,794,239. Virtually any target can be imaged, including, among others, signatures, labels, and people, all involved, for example, in acknowledging receipt of shipping parcels.

The camera module includes a solid-state imager having a sensor array of cells or photosensors, which correspond to image elements or pixels in a field of view of the imager, and an imaging lens assembly for capturing return light scattered and/or reflected from a target being imaged, and for projecting the return light onto the sensor array to initiate capture of an image of the target. The sensor array may be a one- or two-dimensional, color or monochrome, charge coupled device (CCD) or a complementary metal oxide semiconductor (CMOS) device. The imager includes associated circuits connected to the sensor array for producing an output image data stream corresponding to a one- or two-dimensional array of pixel information over the field of view in a color or monochrome format. The imager captures the return light over an exposure time period set under control of a controller or programmed microprocessor that is also operative for processing the output image data stream to generate data indicative of the target being imaged. The microprocessor is programmed to receive the output image data stream in a monochrome or color format.

It is therefore known to use the imager for capturing a monochrome image of a target as, for example, disclosed in U.S. Pat. No. 5,703,349. It is also known to use the imager with multiple buried channels for capturing a full color image of the target as, for example, disclosed in U.S. Pat. No. 4,613,895. It is common to provide a two-dimensional CCD with a 640×480 resolution commonly found in VGA monitors, although other resolution sizes are possible.

In some applications, there may be a format mismatch between the imager and the microprocessor. For example, the microprocessor may be programmed to receive the output image data stream in a color format, but the imager produces the output image data stream in a monochrome format. In such cases, the art has proposed placing a special integrated circuit converter chip between the monochrome imager and the color microprocessor, for converting the output monochrome image data stream to an input color image data stream acceptable to the color microprocessor. As advantageous as this solution is, this converter chip is very costly.

As another example, the microprocessor may be programmed to receive the output image data stream in a monochrome format, but the imager produces the output image data stream in a color format. Again, the art's solution of using a costly converter chip for converting the output color image data stream to an input monochrome image data stream acceptable to the monochrome microprocessor has not proven satisfactory, especially when a low cost camera module is desired.

In addition, there are circumstances when a color microprocessor and a color imager are employed. They are perfectly compatible for processing color images. However, it sometimes occurs, especially when imaging symbols with a camera module in an imaging reader, that processing a monochrome image of the symbol is sufficient and, indeed, is preferred. Operation of a color microprocessor to produce a monochrome image is inefficient, since more electrical power is consumed and more microprocessor memory is used.

Accordingly, it would be desirable to prevent format mismatches between the imager and the microprocessor, avoid using special converter chips, decrease power consumption, waste less microprocessor memory, and acquire a monochrome image of a target, especially a bar code symbol, even when a color imager or a color microprocessor is used in a camera module of an imaging system.

SUMMARY OF THE INVENTION

One feature of the present invention resides, briefly stated, in an arrangement for acquiring a monochrome image of a target. The arrangement includes a solid-state imager operative for capturing return light from the target over a field of view, and for generating an output image data stream having image components arranged in a serial format at a clock frequency. Preferably, the imager is a charge coupled device (CCD) or a complementary metal oxide semiconductor (CMOS) device, with a rolling or a global shutter. The array may be one-dimensional, i.e., linear arranged along a single row, or two-dimensional having mutually orthogonal multiple rows and columns. The imager may be a monochrome imager, in which case the image components are serially arranged in a monochrome format containing a plurality of only intensity components. The imager may also be a color imager, in which case the image components generated by the imager are serially arranged in a color format, for example, a plurality of intensity components alternating with a plurality of color information components.

The arrangement includes a controller or programmed microprocessor operatively connected to the imager for serially receiving and processing the image components at a sampling frequency to generate the monochrome image of the target. The microprocessor may be a monochrome microprocessor, in which case the microprocessor is programmed to expect the image components to serially arrive in a monochrome format containing a plurality of only intensity components. The microprocessor may also be a color microprocessor, in which case the microprocessor is programmed to expect the image components to serially arrive in a color format in which a plurality of intensity components alternate with a plurality of color information components.

In accordance with one aspect of this invention, a clock frequency adjustment circuit is operatively connected to the imager and the microprocessor for adjusting the clock frequency to enable the microprocessor to receive, sample and process the image components and generate the monochrome image. By way of example, if the imager is a monochrome imager that generates the image components in a monochrome format at a clock frequency, for example, 25 MHZ, and if the microprocessor is a color microprocessor preprogrammed to serially receive the image components in a color format at a sampling frequency, for example, 50 MHZ, then the clock frequency adjustment circuit increases, for example, doubles, the clock frequency to match the sampling frequency to enable the microprocessor to only process the intensity components of the output image data stream to generate the monochrome image. Thus, format mismatches between the imager and the microprocessor are prevented, and the use of special converter chips is no longer required.

By way of another example, if the imager is a color imager that generates the image components in a color format at a clock frequency, for example, 50 MHZ, and if the microprocessor is a color microprocessor preprogrammed to serially receive the image components in a color format at a sampling frequency, for example, 50 MHZ, and, in the event that a monochrome image is desired, then the clock frequency adjustment circuit decreases, for example, halves, the clock frequency to enable the microprocessor to only sample and process the intensity components of the output image data stream to generate the monochrome image. Thus, power consumption on the part of the color microprocessor is decreased, and less microprocessor memory is wasted.

Another feature of the present invention resides, briefly stated, in a method of acquiring a monochrome image of a target, and is performed by capturing return light from the target over a field of view of a solid-state imager, generating an output image data stream having image components arranged in a serial format at a clock frequency, serially receiving and processing the image components with a processor at a sampling frequency to generate the monochrome image of the target, and adjusting the clock frequency to enable the processor to receive, sample and process the image components and generate the monochrome image. This method enables a monochrome image of a target, especially a bar code symbol, to be acquired even when the imager is a color imager, or even when the microprocessor is a color microprocessor.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
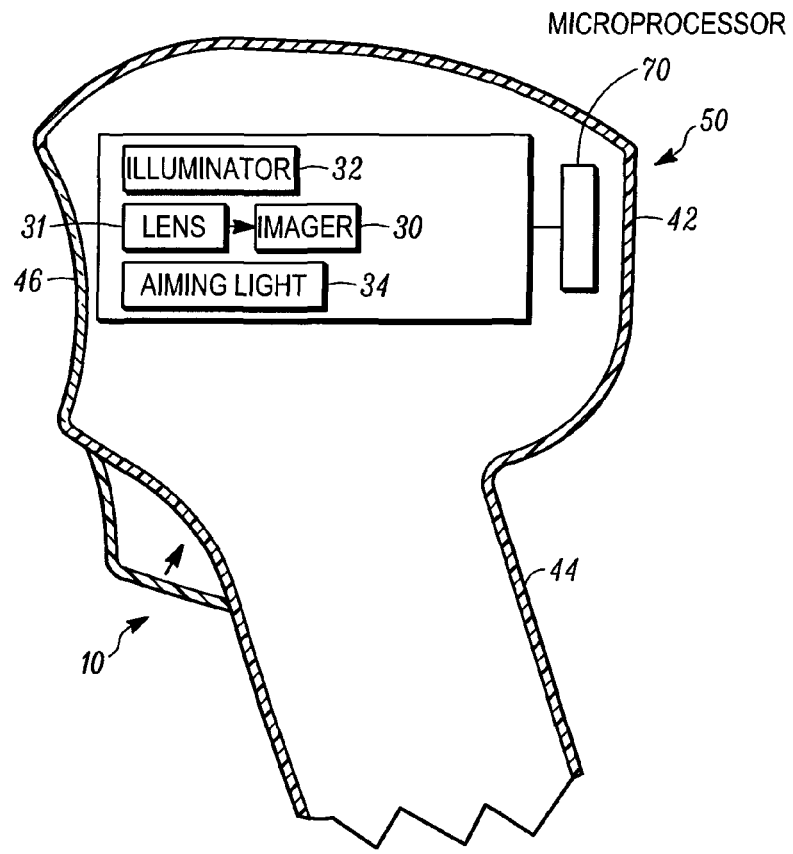
FIG. 1 is a part-sectional, part-schematic view of a portable imaging reader operative for capturing return light from target symbols that may use, or benefit from, this invention.

FIG. 1 depicts an electro-optical, imaging reader 50 for imaging targets, such as symbols to be decoded and read, as well as non-symbols to be imaged, which may use, and benefit from, the present invention. The imaging reader 50 includes a camera module having a one- or two-dimensional, solid-state imager 30, preferably a charge coupled device (CCD) or a complementary metal oxide semiconductor (CMOS) device, with a rolling or a global shutter. The imager 30 is mounted in a handheld housing 42 having a handle 44 on which a trigger 10 for initiating reading is mounted. The imager 30 has an array of image sensors operative, together with an imaging lens assembly 31, for capturing return light reflected and/or scattered from a target through a window 46 during imaging to produce an output image data stream indicative of a captured image for subsequent processing by a controller or programmed microprocessor 70 into an image of the target, and decoding if the target is a symbol.

The imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs) or a laser. An aiming light generator 34 may also be provided for projecting an aiming light pattern or mark on the target prior to imaging.

In operation of the imaging reader 50, the controller 70 sends a command signal to drive the illuminator LEDs/laser 32, either continuously or periodically, and energizes the imager 30 during an exposure time period, say 500 microseconds or less, of a frame to collect light from the target during said time period. A typical array needs about 16-33 milliseconds to read the entire target image and operates at a frame rate of about 30-60 frames per second. The array may have on the order of one million addressable image sensors.

Figure 2:
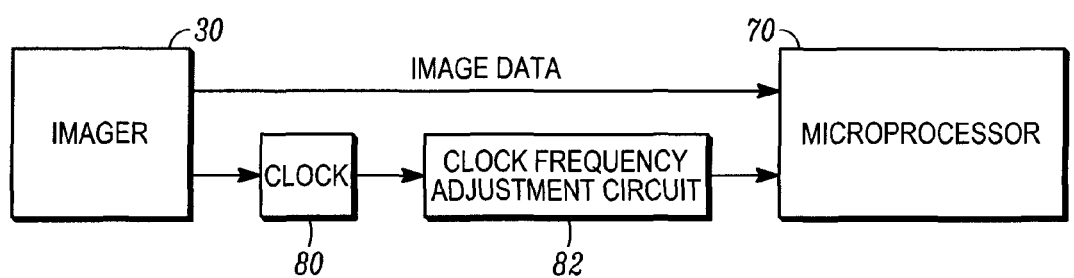
FIG. 2 is a block diagram of a clock frequency adjustment circuit in accordance with this invention for use with an imager, a clock and a microprocessor in the reader of FIG. 1.

The imager 30 captures the return light from the target over a field of view, and generates the output image data stream with image components arranged in a serial format at a clock frequency generated by a clock 80 (see FIG. 2). The imager 30 may be a color imager, in which case the image components generated by the imager 30 are serially arranged in a color format, for example, as shown in FIG. 3, or in a monochrome format, as shown in FIG. 4.

Figures 3, 4, 5, 6:
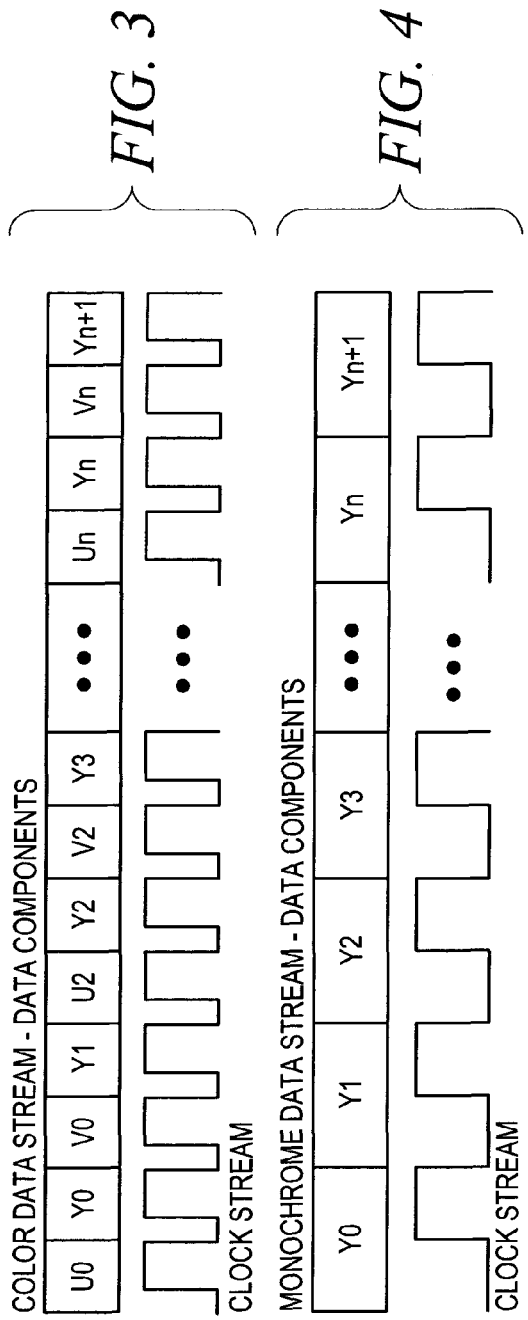
FIG. 3 is an output image data stream in a color format generated by a color imager, synchronized with a clock stream of clock signals produced by a clock at a clock frequency.
FIG. 4 is an output image data stream in a monochrome format generated by a monochrome imager, synchronized with a clock stream of clock signals produced by a clock at a clock frequency.
FIG. 5 is a frequency-adjusted output image data stream generated by the monochrome imager of FIG. 4 after the clock frequency adjustment circuit has doubled the clock frequency.
FIG. 6 is a representation of how the microprocessor sees and receives the frequency-adjusted output image data stream of FIG. 5.

By way of background information, there are many color formats, and FIG. 3 depicts an exemplary color format, namely the YUV 4:2:2 format for encoding a color image in a YUV color space. The "Y" component designates the brightness or intensity (luma) of a pixel; and the "U" and "V" components designate the color information or color difference (chrominance) of the pixel, with the "U" component designating the color difference of the luma signal relative to the color blue, and the "V" component designating the color difference of the luma signal relative to the color red. In the YUV 4:2:2 format, a sample of the Y component is taken at every pixel, and samples of the U and V components are taken at every second pixel horizontally on each line or row of an image. By convention, when describing the image data components of the pixels, the Y component is incremented by 1 (Y0, Y1, etc.) and the U and V components are incremented by 2 (U0, U2, V0, V2, etc.) along each row.

Returning to FIG. 3, in this color format, the image data is transferred one line at a time. Each line consists of the following sequence of image data components: U0, Y0, V0, Y1, U2, Y2, V2, Y3, . . . , Un, Yn, Vn, Yn+1, where Y0, Y1, Y2, Y3 . . . Yn, Yn+1 are the intensity components, and where U0, V0, U2, V2 . . . Un, Vn are the color information components. The output image data stream is illustrated in FIG. 3, together with a pixel clock stream of clock signals produced by the clock 80 at a clock frequency, for example, on the order of 50 MHz. Each image data component transition occurs on the falling edge of the clock signal, and each image data component is stable, and can be sampled by the microprocessor 70, on the rising edge of the clock signal. In this color format, each intensity component (Y) alternates with a color information component (U or V). A color microprocessor 70 expecting to serially receive the output image data stream of FIG. 3 would be operative at a sampling frequency that matches the clock frequency, i.e., 50 MHZ, and, of course, memory space would have to be reserved for all the intensity and color information components.

FIG. 4 depicts an exemplary monochrome format, in which only intensity components Y0, Y1, Y2, Y3 . . . Yn, Yn+1 are serially produced by a monochrome imager. There are no color information components. A pixel clock stream of clock signals produced by the clock 80 at a clock frequency, for example, on the order of 25 MHZ, is shown together with the output monochrome image data stream. Each intensity component transition occurs on the falling edge of the clock signal, and each intensity component is stable, and can be sampled by the microprocessor 70, on the rising edge of the clock signal. A monochrome microprocessor 70 expecting to serially receive the output monochrome image data stream of FIG. 4 would be operative at a sampling frequency that matches the clock frequency, i.e., 25 MHZ, and, of course, memory space would only have to be reserved for the intensity components.

In accordance with one aspect of this invention, assume that the imager 30 is a monochrome imager that generates the image data components in the monochrome format of FIG. 4 at a clock frequency of 25 MHZ, and further assume that the microprocessor 70 is a color microprocessor preprogrammed to serially receive the image data components in the color format of FIG. 3 at a sampling frequency of 50 MHZ. In this format and frequency mismatch, the color microprocessor 70 would interpret some of the intensity components as color information components and would not produce a coherent image. That is, Y0 would be interpreted as U0, Y1 as Y0, Y2 as V0, etc.

To enable the color microprocessor 70 to receive, sample and process the output monochrome image data stream as a monochrome image without corruption, one aspect of this invention proposes, as shown in FIG. 2, a clock frequency adjustment circuit 82 operatively connected to the clock 80 for adjusting the clock frequency to enable the microprocessor 70 to receive, sample and process the image components and generate the monochrome image. More particularly, the clock frequency adjustment circuit 82 increases, for example, doubles, the clock frequency of 25 MHZ to match the sampling frequency of 50 MHZ of the color microprocessor 70 to enable the microprocessor to only process the intensity components of the output image data stream to generate the monochrome image. The output monochrome image data stream has thus been frequency-adjusted or reformatted, as shown in FIG. 5, together with the frequency-adjusted clock stream.

Put another way, extra clock signal edges have been inserted into the output monochrome image data stream. The microprocessor 70 sees the frequency-adjusted output image data stream of FIG. 5 in the representation shown in FIG. 6. The data components that are presented in memory for the U and V components may be considered as irrelevant (marked with an x in FIG. 6), because the microprocessor 70 can be programmed to ignore these data components. Under certain circumstances, it is possible to insert meaningful data, such as status information, image statistics, etc. in the memory for the U and V components. Thus, format and frequency mismatches between the imager and the microprocessor are prevented, and the use of special converter chips is no longer required.

Figure 7:
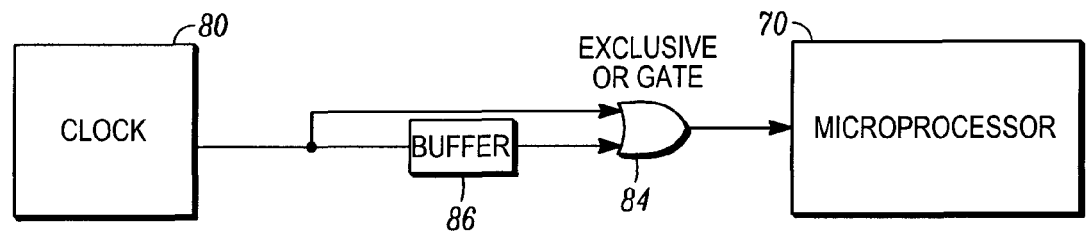
FIG. 7 is an electrical schematic of one embodiment of the clock frequency adjustment circuit in accordance with this invention.

FIG. 7 depicts an example of a frequency doubler circuit that can be used for the clock frequency adjustment circuit 82. The clock 80 is connected to one input of an exclusive OR-gate 84, and the clock 80 is connected to the other input of the exclusive OR-gate 84 via a delay component or buffer 86. The output of the exclusive or-gate 84 provides two clock signal pulses for each input clock signal pulse.

Other frequency doubler circuits can be implemented through discrete logic gates or with logic cells in a field programmable gate array (FPGA) or an application specific integrated circuit (ASIC). The timing of each clock pulse must be aligned with the color data stream or monochrome data steam to create the reformatted data stream. Another frequency doubling approach is to sample the monochrome data on both edges of each original clock signal pulse.

In accordance with another aspect of this invention, assume that the imager 30 is a color imager for generating the image data components in the color format of FIG. 3 at the clock frequency of 50 MHZ, and further assume that the microprocessor 70 is a color microprocessor preprogrammed to serially receive the image data components in the color format of FIG. 3 at the sampling frequency of 50 MHZ. In the event that a monochrome image of a bar code symbol, for example, is desired, then the clock frequency adjustment circuit 82 decreases, for example, halves, the clock frequency of 50 MHZ to enable the color microprocessor 70 to only process the intensity components of the output image data stream to generate the monochrome image. Thus, power consumption on the part of the color microprocessor 70 is decreased, and less microprocessor memory is wasted.

Figure 8:
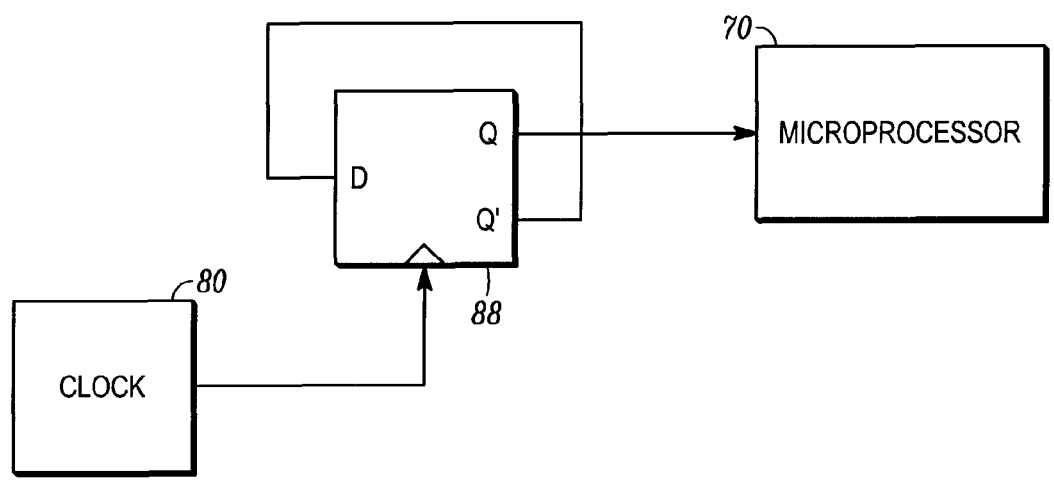
FIG. 8 is an electrical schematic of another embodiment of the clock frequency adjustment circuit in accordance with this invention.

FIG. 8 depicts an example of a frequency divider circuit that can be used for the clock frequency adjustment circuit 82. An edge-triggered D-type flip-flop 88 has an inverted output Q' connected to its input D. In this configuration, the outputs Q and Q' will toggle states on each rising clock edge. The output Q is connected to the microprocessor 70. The clock frequency generated by the clock 80 is divided in half at the microprocessor 70.

It will be understood that each of the elements described above, or two or more together, also may find a useful application in other types of constructions differing from the types described above.

While the invention has been illustrated and described as an arrangement for, and a method of, acquiring a monochrome image of a target in an imaging reader having a color imager and/or a color microprocessor, it is not intended to be limited to the details shown, since various modifications and structural changes may be made without departing in any way from the spirit of the present invention. For example, this invention is not to be limited solely to imaging readers whose only function is to image bar code symbols, but could equally apply to mobile computers or terminals having an imager or camera module as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for acquiring a monochrome image of a target, comprising:
    a solid-state imager for capturing return light from the target over a field of view, and for generating an output image data stream having image components arranged in a serial format at a clock frequency;
    a preprogrammed microprocessor operatively connected to the imager for serially receiving and processing the image components at a sampling frequency to generate the monochrome image of the target;
    a clock frequency adjustment circuit operatively connected to the imager and the microprocessor for adjusting the clock frequency to enable the microprocessor to receive and process the image components and generate the monochrome image; and
wherein the imager is a monochrome imager for generating the image components in a monochrome format only as a plurality of intensity components; wherein the microprocessor is a color microprocessor preprogrammed to serially receive the image components in a color format as a plurality of intensity components alternating with a plurality of color information components; and wherein the clock frequency adjustment circuit increases the clock frequency to enable the microprocessor to only process the intensity components of the output image data stream to generate the monochrome image.

2. The arrangement of claim 1, wherein the clock frequency adjustment circuit doubles the clock frequency to match the sampling frequency.

3. An arrangement for acquiring a monochrome image of a target, comprising:
    imaging means for capturing return light from the target over a field of view, and for generating an output image data stream having image components arranged in a serial format at a clock frequency;
    processing means for serially receiving and processing the image components at a sampling frequency to generate the monochrome image of the target;
    adjusting means for adjusting the clock frequency to enable the processing means to receive and process the image components and generate the monochrome image; and
wherein the imaging means generates the image components in a monochrome format only as a plurality of intensity components; wherein the processing means serially receives the image components in a color format as a plurality of intensity components alternating with a plurality of color information components; and wherein the adjusting means increases the clock frequency to enable the processing means to only process the intensity components of the output image data stream to generate the monochrome image.

4. The arrangement of claim 3, wherein the adjusting means doubles the clock frequency to match the sampling frequency.

5. A method of acquiring a monochrome image of a target, comprising the steps of:
    capturing return light from the target over a field of view of a solid-state imager, and generating an output image data stream having image components arranged in a serial format at a clock frequency;
    serially receiving and processing the image components with a processor at a sampling frequency to generate the monochrome image of the target;
    adjusting the clock frequency to enable the processor to receive and process the image components and generate the monochrome image; and
wherein the generating step is performed by generating the image components in a monochrome format only as a plurality of intensity components; wherein the processing step is performed by serially receiving the image components in a color format as a plurality of intensity components alternating with a plurality of color information components; and wherein the adjusting step is performed by increasing the clock frequency to enable the processor to only process the intensity components of the output image data stream to generate the monochrome image.

6. The method of claim 5, wherein the adjusting step is performed by doubling the clock frequency to match the sampling frequency.

* * * * *

UNITED STATES PATENT AND TRADEMARK OFFICE
CERTIFICATE OF CORRECTION

| | | |
|---|---|---|
| PATENT NO. | : 8,355,054 B2 | Page 1 of 1 |
| APPLICATION NO. | : 12/603624 | |
| DATED | : January 15, 2013 | |
| INVENTOR(S) | : Carlson et al. | |

It is certified that error appears in the above-identified patent and that said Letters Patent is hereby corrected as shown below:

In the Specification:

In Column 6, Line 24, delete "data steam" and insert -- data stream --, therefor.

Signed and Sealed this
Fourth Day of June, 2013

Teresa Stanek Rea
*Acting Director of the United States Patent and Trademark Office*